Oct. 13, 1936.   J. J. ALLISON ET AL   2,057,407
MACHINE FOR LEVELING LAND AND FORMING BORDERS
Filed March 23, 1936   3 Sheets-Sheet 1
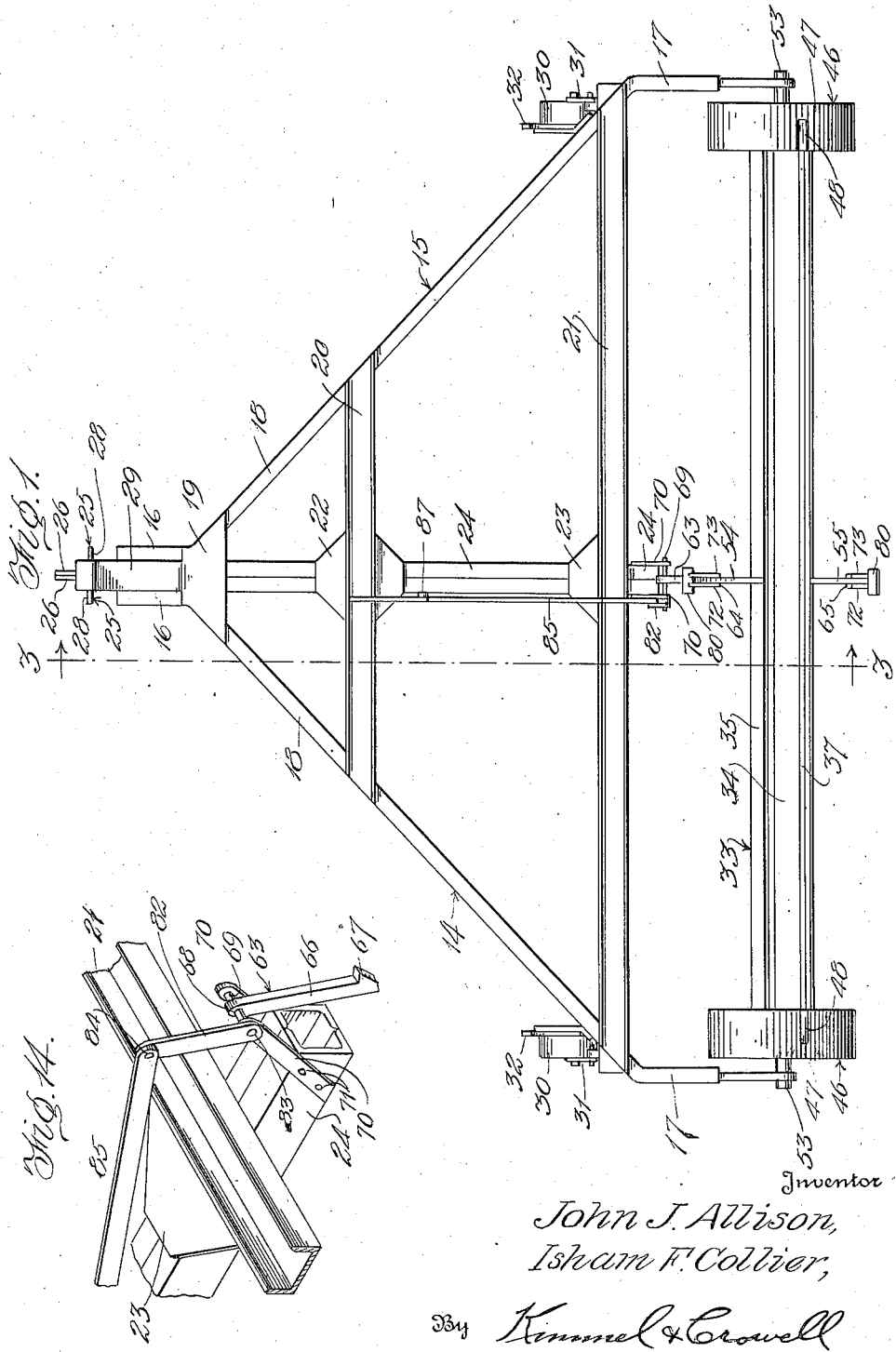
Inventor
John J. Allison,
Isham F. Collier,
By Kimmel & Crowell
Attorneys

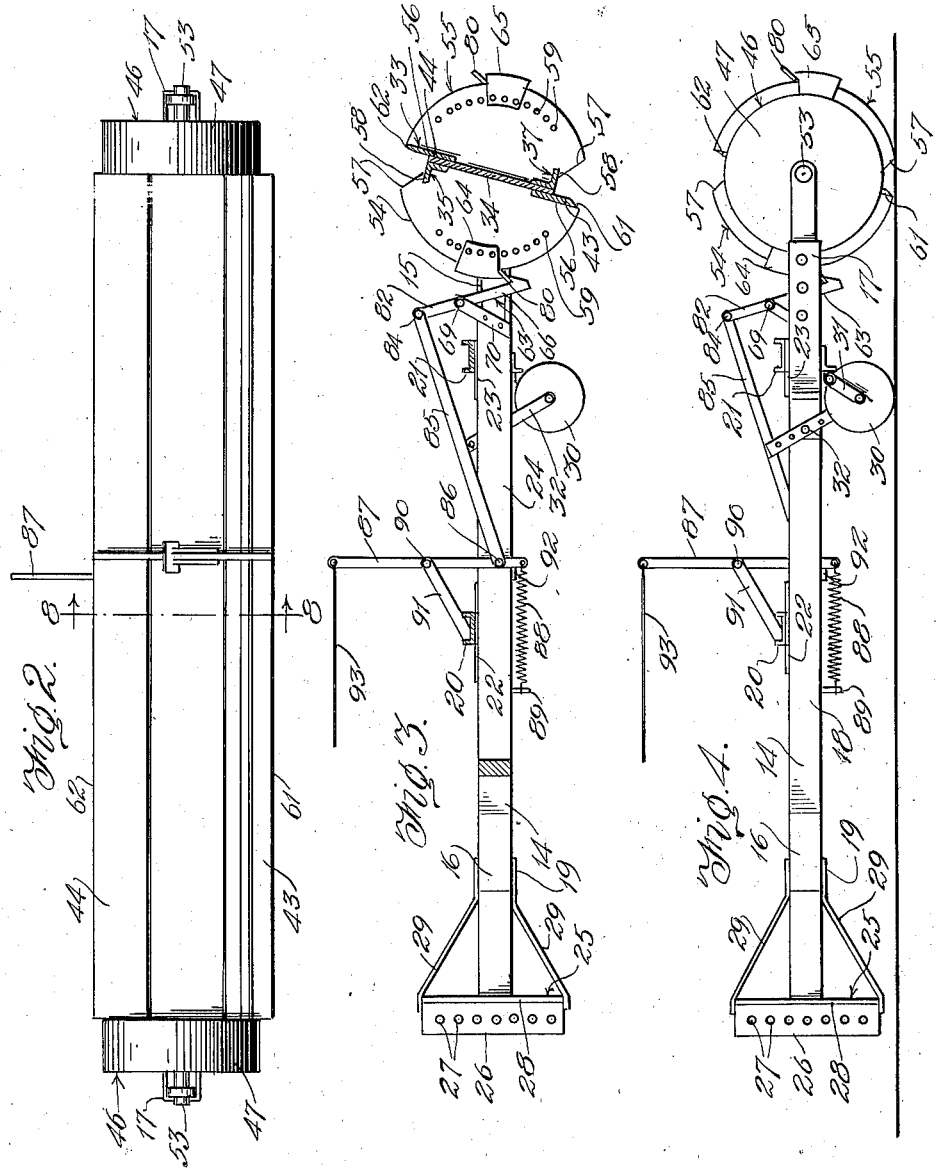

Oct. 13, 1936.  J. J. ALLISON ET AL  2,057,407
MACHINE FOR LEVELING LAND AND FORMING BORDERS
Filed March 23, 1936  3 Sheets—Sheet 3
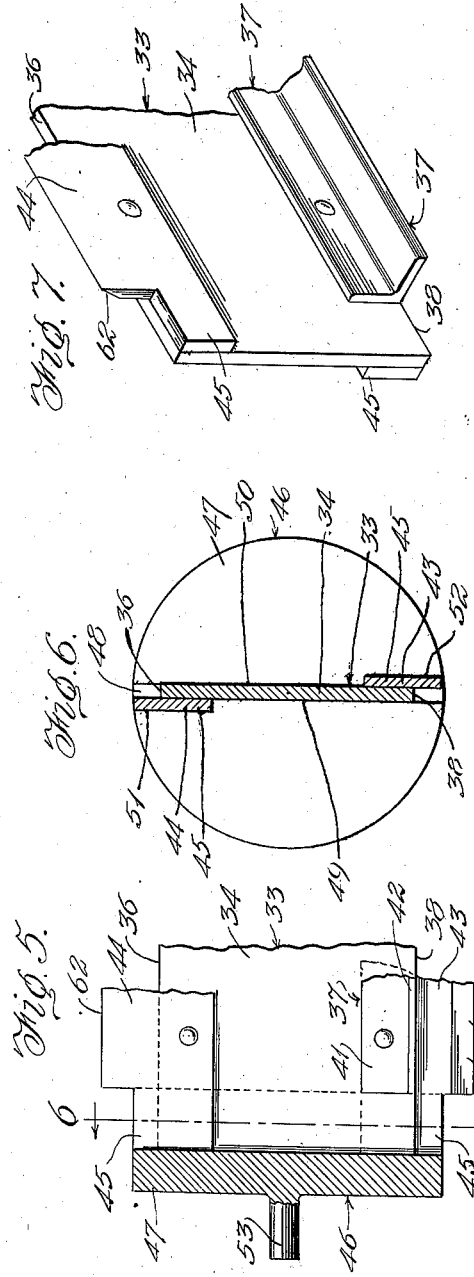
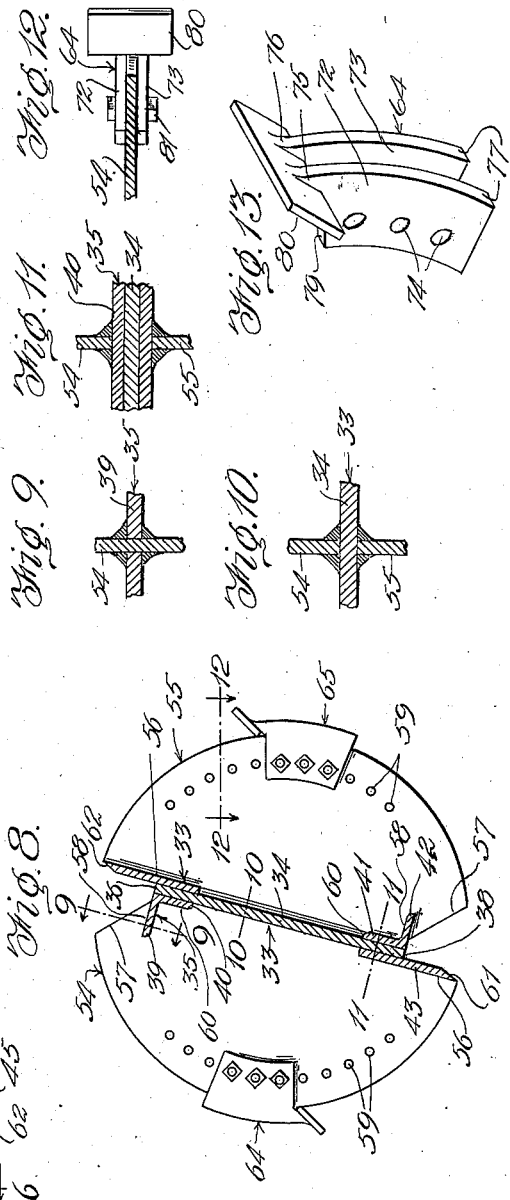
Inventor
John J. Allison,
Isham F. Collier,
By Kimmel & Crowell
Attorneys Patented Oct. 13, 1936

2,057,407

UNITED STATES PATENT OFFICE 2,057,407

MACHINE FOR LEVELING LAND AND FORMING BORDERS

John J. Allison, Chandler, and Isham F. Collier, Tempe, Ariz.

Application March 23, 1936, Serial No. 70,486

6 Claims. (Cl. 37—169)

This invention relates to a machine for leveling land and forming borders and is designed primarily for use in making borders in irrigated districts for soil erosion work, cleaning feed pens and barnyards, but it is to be understood that a machine, in accordance with this invention may be employed in any connection for which it may be found applicable, and the object of the invention is to provide, in a manner as hereinafter set forth a machine of the class referred to that may be traversed over the surface to be acted on by a light, as well as a heavy tractor and being so arranged whereby its operation will be under the control of the driver of the tractor with no extra assistance.

A further object of the invention is to provide, in a manner as hereinafter set forth a machine of the class referred to including a double edge scraper element and means coacting with said element for releasably latching the edges of the latter successively in scraping position.

A further object of the invention is to provide, in a manner as hereinafter set forth, a machine of the class referred to including an intermittently revoluble scraper element having a pair of scraping edges for successively scraping the surface of the said land for such distance as the operator may see fit and with said element functioning to successively dump the loads of dirt gathered thereby during the successive scraping actions of said edges.

A further object of the invention is to provide, in a manner as hereinafter set forth, a machine of the class referred to including an intermittently revoluble double edge scraper element and means, under the control of the operator to provide for the said edges being releasably latched successively in land scraping position and said element in non-dumping position.

A further object of the invention is to provide, in a manner as hereinafter set forth a double acting scraper element capable of being adjusted in a manner whereby one side thereof will act to dump a load scraped up by such side while the other side is being moved to scraping position.

A further object of the invention is to provide, in a manner as hereinafter set forth, a machine of the class referred to including an angularly adjustable, intermittently revoluble, releasably latched scraper element formed with a pair of successively active scraping edges and with said element functioning as a dumping means for the loads of dirt gathered thereby during the scraping action thereof.

Further objects of the invention are to provide, in a manner as hereby set forth, a machine for the purpose referred to which is simple in its construction, strong, durable, compact, readily assembled, thoroughly efficient in its use, conveniently controlled, automatic in its dumping action, capable of being expeditiously repaired when occasion requires and comparatively inexpensive to set up.

With the foregoing and other objects in view, the invention consists of the novel construction, combination and arrangement of parts as will be more specifically referred to and as are illustrated in the accompanying drawings herein is shown an embodiment of the invention, but it is to be understood that changes, variations and modifications may be resorted to which fall within the scope of the invention as claimed.

In the drawings:—

Figure 1 is a top plan view of the machine,

Figure 2 is a top plan view of the scraper element and the revoluble carriers therefor, Figure 3 is a section on line 3—3 Figure 1, Figure 4 is a side elevation of the machine, Figure 5 is a fragmentary view, upon an enlarged scale, partly in elevation and partly in section of the scraper element and one of the carriers for the latter, Figure 6 is a section on line 6—6, Figure 5, Figure 7 is a fragmentary view, upon an enlarged scale in perspective of the scraper element, Figure 8 is a section on line 8—8 Figure 2 and upon an enlarged scale, Figures 9, 10, 11 and 12 are respectively sections on lines 9—9, 10—10, 11—11, and 12—12, Figure 8, Figures 13 is a perspective view, upon an enlarged scale of the form of keeper element of the latching device, and Figure 14 is an enlarged view of the latching device and its actuating lever.

The machine includes a body portion of framelike form consisting of a pair of oppositely disposed side bars 14, 15, of like form and each of which includes a forward end stretch 16, a rearward end stretch 17 and an inclined intermediate stretch 18 of materially greater length than the stretches 16, 17. The stretch 18 inclines outwardly from the forward end of stretch 17 to the rear end of stretch 16. The stretches 16 of the bars 14, 15 are arranged in parallel spaced relation, and this arrangement also applies to the stretches 17 of said bars. The forward end terminal portions of the stretches 18 have secured thereupon a coupling plate 19 and which extends upon the rear portions of the stretches 16. The stretches 18 intermediate their ends are connected together by a channel bar 20. The stretches 18 in close proximity to the stretches 17 are connected together by a channel bar 21. Secured to the lower faces of the bars 20, 21, are gusset plates 22, 23 respectively. The plate 22 extends rearwardly and forwardly with respect to the bar 20. The plate 23 extends forwardly only with respect to the bar 21. Positioned against the gusset 22, 23 and extending between the stretches 26 is a draw bar 24 formed of a pair of oppositely disposed channel irons. The draw bar 24 is anchored by any suitable means to the stretches 26 and plates 22, 23. Positioned at the forward end of the draw bar 24 is a pair of oppositely disposed abutting angle-shaped members 25 having the flanges 26 thereof formed with registering openings 27. The members 25 constituting a hitch for the draw bar 24. The members 25 are vertically disposed and the flanges 28 thereof have their rear faces anchored to the forward end of the bar 24. Fixedly secured to the draw bar 24 is a pair of oppositely disposed brace members 29 which have their forward ends anchored to the upper and lower ends of the members 25. Supporting wheels 30 for the frame are suspended, as at 31 from the stretches 18 and are adjustably connected, as at 32 with the stretches 18.

The machine includes a scraper element generally indicated at 33 and it consists of a flat rectangular, elongated plate 34 provided at one side with an angle iron 35 which is of less length than the plate 34, but it is flush with the edge 36 of the latter. Secured to the other side of plate 36 is an angle iron 37 of less length than the length of plate 36, but it is flush with the edge 38 of such plate. The angle irons 35, 36 are oppositely disposed and provide reinforcing means for the plate 34. The flanges of the angle iron 35 are indicated at 39, 40. The latter is secured to plate 34. Flange 39 is arranged at the top of flange 40 and extends outwardly therefrom. The flanges of the angle iron 37 are indicated at 41, 42. The flange 41 is anchored to the plate 34. The flange 42 extends outwardly from the bottom of the flange 41. Secured to that side of the plate 34 to which the flange 40 is anchored is a scraper member 43 which extends outwardly from the edge 38 of plate 34. Secured to that side of the plate 34 to which the flange 41 is anchored is a scraper member 44 which projects from the edge 36 of the plate 34. Each cutter member has each end thereof reduced as at 45 for a purpose to be referred to.

The scraper element 33 has each end thereof anchored to a revoluble carrier 46. The carriers are of like form and each of which consists of a circular disc 47 having its inner portion formed with a groove 48 corresponding in length to the diameter of the disc 47. The walls of the groove 48 are indicated at 49, 50. The wall 49 is rabbeted as at 51. The wall 50 is rabbeted as at 52. The rabbets 51, 52 are spaced from each other and arranged in offset relation. Formed integral with the outer face of disc 47 axially thereof is a journal or stub shaft 53. The width of plate 34 is less than the diameter of a carrier 46. Each end portion of the scraper element 33 extends into a groove 48 and the rabbets 51, 52. The arrangement is such that one end of the plate 34 is arranged in a groove 48 and with the edges 36, 38 of the plate spaced inwardly adjacent to the edge of the disc 47, an end portion 45 of member 43 and an end portion 45 of member 44 are arranged in the rabbets 51, 52 and are flush with the edge of the disc 47. The non-reduced intermediate portion 54 of each scraper member is disposed in extended relation with respect to the carriers 46.

Carried by the scraper element 33 is an angularly adjusting means therefore and with reference to Figure 8 the said means consists of a pair of oppositely disposed substantially semi-circular plates 54, 55 of like form. Each plate has its inner edge rabbeted as at 56 at one end and said inner edge at its other end is formed with an inclined stretch 57. Each plate is also formed with a groove 58 at the inner end of the stretch 57 and which opens at the inner edge of the plate. Each plate is also formed with an arcuate row of spaced openings 59 in proximity to its outer edge. Each plate is further formed with a rabbet 60 terminating at the mouth of the groove 58. The inner edges of the plates are arranged in parallel spaced relation. The plate 54 is arranged on one side of the element 33 and plate 55 on the other side of such element. When the plates are arranged in opposed relation the inclined stretch 57 of the plate 54, opposes the rabbet 56 of the plate 55, the mouth of groove 58 of plate 54 opposes the rabbet 56 of the plate 55 and the rabbet 60 of the plate 54 opposes the rabbet 56 of the plate 55. When the plates 54, 55 are arranged in opposed spaced relation the stretch 57 of the plate 55 opposes the rabbet 56 of the plate 54, the mouth of the groove 58 of the plate 55 opposes the rabbet 56 of the plate 54 and the rabbet 60 of the plate 55 opposes the rabbet 56 of the plate 54. When the plates 54, 55 are arranged on opposite sides of the element 33, the scraper member 44 is mounted in the rabbet 56 of plate 55, the angle iron 35 extends into the groove 58 and rabbet 60 of the plate 54, the scraper member 43 is positioned in the rabbet 56 of plate 54, the angle iron 37 is arranged in the groove 58 and rabbet 60 of plate 55, the stretch 57 of the plate 54 inclines away from the scraper member 44 and the stretch 57 of plate 55 inclines away from the scraper member 43. The scraping edges of the scraper members 43, 44 are indicated at 61, 62 respectively and they are flush with the outer edges of the plates 54, 55 respectively. The scraper element 33 and the plates 54, 55 are welded together and with reference to Figures 9 to 12 the weld is shown.

The machine includes a latching mechanism including a pivoted latching member 63 and a pair of oppositely disposed adjustable keeper members 64, 65 capable of being adjusted in an arcuate path. The keeper members 64, 65 are selectively engaged by the latching member 63 for the purpose of releasably latching the scraper element 33 from movement to hold one of the scraper members 43 or 44 in active position during the traversing of the ground by the machine. The latching member 63 with reference to Figure 14 consists of a shank 66 formed at one end with a latching nose 67 and at its other end with a opening 68 for a purpose to be referred to. The latching mechanism includes a rotatable shaft 69 extending through opening 68 in shank 66 as well as being fixedly secured to such shank. The shaft 69 is rotatably mounted in the upper ends of a pair of spaced, upstanding, parallel, forwardly extending support 70 fixed at their lower ends, as at 71 to the sides of the draw bar 24 rearwardly of the channel irons 21. The keeper members 64, 65 are of like construction and each of which, with reference to Figure 13 includes a pair of spaced, parallel, curved plates 72, 73 of like form provided with an arcuate row of spaced openings 74, the openings in the plate 72 align with the openings 74 in the plate 73. The plates 72, 73 at one end thereof are provided with extensions 75, 76 respectively substantially of triangular contour having their outer side edges forming a flush continuation of the side edges 77 of the plates 72, 73. The inner side edges of the extensions 75, 76 are spaced outwardly with respect to the inner side edges 78 of the plate 72, 73. Secured upon the top edges 79 of the plate 72, 73 and also secured to the inner side edges of the extensions 75, 76 is a rectangular retainer 80 of a length to extend laterally from the outer side of plate 72 and the outer side of plate 73 and of a width to project outwardly beyond the outer ends of the extensions 75, 76. The keeper member 64 straddles the plate 54 and the keeper member 65 straddles the plate 55. The said keeper members 64, 65 have their openings 74 register with the openings 59 of the plates 54, 55. The keeper members 64, 65 when mounted on the plates 54, 55 are spaced and oppositely disposed and in this connection attention is directed to Figure 8. The keeper members 64, 65 are secured in their adjusted position relative to the plates 54, 55 by the releasable, holdfast means 81 extending through openings of the keeper members and through selected openings 59 of the plates 54, 55. The latching member 66 has its nose engaging with a retainer 80 for holding the scraper element in angular position during the operation of the machine. The angle in which the scraper element is arranged depends upon the adjusted position of the keeper members 64, 65 with respect to the plate 54, 55 respectively. The keeper members 64, 65 when adjusted are moved to a position diametrically opposite each other with relation to the plates 54, 55. The distance between the scraper member 44 and keeper member 64 and the distance between scraper member 43 and keeper member 65 provides for the angular disposition of the scraper element.

An actuating mechanism, under the control of the driver of the tractor is provided for releasing the latching member 66 from engagement with a keeper member and after the scraper element has dumped a load, the other keeper member will automatically engage with the latching member for the purpose of latching the scraper element from revolving. The actuating mechanism is spring controlled and it includes a holder for maintaining it from movement when the latching member is engaged with a retainer of one of the keeper members. The said actuating mechanism includes a link 82 connected at its lower end, as at 83 to one end of the shaft 69 and at its other end pivotally connected, as at 84 to the rear end of a pull bar 85. The forward end of the pull bar 85 is pivotally connected, as at 86 to an actuating lever 87. The pivot between the pull member 85 and lever 86 is arranged in proximity to the lower ends of lever 87. Attached to the lower end of lever 87 is a controlling spring 88. The latter is also anchored to a lug 89 depending from the draw bar 24. Pivotally connected, as at 90 to the lever 87, intermediate the ends of the latter is a forwardly inclined, downwardly directed holding arm 91 which releasably seats in the channel bar 20 for the purpose of maintaining the lever 87 in a vertical position and to arrest the shifting of the actuating mechanism when the latter is in the position shown in Figure 4. Lever 87 in proximity to its lower end is provided with a stop 92 for limiting the shift of lever 87 to its normal or inactive position. The stop 92 coacts with the lower face of the draw bar 24 and when in such position the lever 87 is maintained vertically and in this connection attention is directed to Figures 3 and 4. The upper end of lever 87 has connected thereto a forwardly directed controlling cable 93 which is of a length to extend to the tractor to enable it to be pulled forwardly by the driver of the tractor for the purpose of operating such actuating mechanism to shift the latching member 63 clear of the retainer of the keeper member 64 or 65. The actuating mechanism is returned to normal position by the spring 88 and such spring also acts as a controlling means for the latching member 63.

The journals 53 on the carriers 46 are mounted in bearings 94 connected to and extending rearwardly from the stretches 17 of the bars 14, 15.

The construction of the machine is such that it will scrape the surface of the land for such a distance as the operator may see fit and then by pulling the cable 93 forwardly the scraper element 33 will be released causing the scraper element to dump the load, gathered by one side thereof during its revolution. That scraping member which has been inactive will be moved to active position and the inactive keeper member will be shifted to an extent to be engaged by the latching member whereby the revolving of the scraper element will be discontinued and the scraping action of the scraper element continued. The scraper element is revolved one-half revolution at spaced intervals. It is to be understood that after the scraping element has been revolved one-half revolution, the scraping action will be continued if the tractor is traversing the machine over the ground. In view of the foregoing the machine provides for one side of the scraping element being active until the load is dumped, whereupon the other side of the scraper element takes up the scraping action until also the load is dumped and this cycle of operation continues.

The machine is attached to the tractor, not shown by the hitch at the forward end of the draw bar 24 and the openings in the hitch provide for the vertical adjustment thereof relative to the tractor draw bar. This vertical adjustment of the draw bar regulates the depth of the cut of the scraper element 33.

It will be assumed that one of the scraper members is disposed in scraping position by the coaction of the keeper member 64 with the latching member 66 and which impedes the natural tendency of keeper member 64 to revolve in the direction in which the tractor is pulling. Now in order to dump the load of dirt the operator pulls the cable 93 forwardly. This action releases the latching member 66 from the keeper member 64, allowing the scraper element and carriers, which are solidly attached to each other to revolve in the direction in which the tractor is pulling the machine causing the dumping of a load of dirt and the moving of keeper member 65 to engage with the latching member 63 to arrest the revolving movement of the scraper element and carriers and to latch the scraper element in scraping position.

What we claim is:

1. In a mobile machine for levelling land and forming borders, a pair of spaced carriers capable of being intermittently revolved in the direction of travel of the machine, a scraper element including an elongated rectangular plate provided lengthwise thereof with a pair of oppositely extending spaced scraper members disposed in projected relation with respect to the lengthwise edges of said plate and to the carriers, said plate positioned between and having its ends anchored in and diametrically of the carriers for bodily revolving therewith to successively dump the loads gathered by the scraping members, oppositely disposed spaced keeper members, spaced from, connected with and bodily moving with said plate intermediate the ends of the latter, and an actuatable latching member common to, arranged in the path of and selectively and releasably engaging with said keeper members to arrest the revolving of the carriers at the end of a half revolution, to releasably retain the carriers from revolving and to latch a scraper member in active position.

2. The invention as set forth in claim 1 having a body portion formed at the forward end with means for adjustably hitching it to a traction means therefore and spaced means at the rear end constituting bearings, having said carriers positioned inwardly of and journaled in said bearings, having said latching member pivotally suspended from said body portion, and having a spring controlled actuating mechanism, carried by said body portion for and connected to said latching member.

3. In a mobile machine for levelling land and forming borders, a pair of spaced carriers capable of being intermittently revolved in the direction of travel of the machine, a scraper element provided with a pair of oppositely extending spaced scraper members disposed in projected relation with respect to the carriers, said element positioned between and having its ends anchored to the carriers for bodily revolving therewith to successively dump the loads gathered by the scraping members, oppositely disposed spaced keeper members connected with and bodily moving with said element, an actuatable latching member common to, arranged in the path of and selectively and releasably engaging with said keeper members to arrest the revolving of the carriers at the end of a half revolution, to releasably retain the carriers from revolving and to latch a scraper member in active position, laterally extending oppositely disposed plates anchored to opposite sides of said element intermediate the ends of the latter and each provided with openings, said keeper members being adjustable relative to said plates and coacting with said latching member for angularly disposing said element to the line of draft, said keeper members being provided with openings for registry with selective openings of said plates, and means extending through the registering openings for detachably securing the keeper members in adjusted position.

4. In a mobile machine for levelling land and forming borders, a frame-like body, a pair of spaced circular carriers arranged at and revolubly supported in the rear end of said body, a scraper element having reduced end portions anchored in the inner sides of said carriers diametrically of the latter to provide for the dragging of the carriers and element in unison and for the bodily revolving of the element and carriers in unison, said element including an elongated rectangular plate provided lengthwise thereof with a pair of oppositely extending spaced scraper members disposed in extended relation with respect to the lengthwise edges of said plate and disposed in extended relation with respect to said carriers, and controllable means carried by said plate and mounted on said body to permit the carriers and element bodily revolving together intermittently half revolutions and for releasably latching said carriers and element at the end of each half revolution.

5. The invention as set forth in claim 4 having that part of said means carried by said plate including oppositely adjustable members coacting with the means on said body for maintaining said element at an inclination with respect to the line of draft.

6. In a mobile machine for levelling land and forming borders, a pair of revoluble oppositely disposed circular carriers of like form having stub shafts axially of the outer sides thereof, the inner side of each carrier having a diametrically extending groove, each side wall of the groove having a rabbet at one end, a rectangular plate having its ends anchored in the furcations of the carriers, a pair of oppositely disposed scraping members secured to opposite sides of and extending from the lengthwise edges of the plates, said members having reduced portions anchored in said rabbets, and reinforcing members secured to opposite sides of the plate and arranged between the carriers.

JOHN J. ALLISON.
ISHAM F. COLLIER.